(12) United States Patent
Fukuyo (10) Patent No.: US 12,323,688 B2
(45) Date of Patent: Jun. 3, 2025

(54) IMAGING APPARATUS

(71) Applicant: CANON KABUSHIKI KAISHA, Tokyo (JP)

(72) Inventor: Keisuke Fukuyo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 18/339,154

(22) Filed: Jun. 21, 2023

(65) Prior Publication Data
US 2023/0421875 A1 Dec. 28, 2023

(30) Foreign Application Priority Data
Jun. 23, 2022 (JP) .................. 2022-101181

(51) Int. Cl.
*H04N 23/54* (2023.01)
*H04N 23/52* (2023.01)

(52) U.S. Cl.
CPC ............. *H04N 23/54* (2023.01); *H04N 23/52* (2023.01)

(58) Field of Classification Search
CPC ...... H04N 23/52; H04N 23/555; H04N 23/54; H04N 23/55
USPC ....................................................... 348/374
See application file for complete search history.

(56) References Cited

U.S. PATENT DOCUMENTS

| | | | |
|---|---|---|---|
| 7,829,833 B2 * | 11/2010 | Kobayashi ............. | H04N 23/52 250/214 R |
| 10,972,642 B2 * | 4/2021 | Mayumi ................. | H10F 39/12 |
| 11,064,099 B2 * | 7/2021 | Kusuda ................... | H10F 39/12 |
| 11,343,417 B2 * | 5/2022 | Urakami ................ | H04N 23/54 |
| 11,942,495 B2 * | 3/2024 | Chino .................... | H01L 23/02 |
| 12,051,707 B2 * | 7/2024 | Mayumi ............... | H10F 39/804 |
| 2006/0278810 A1 * | 12/2006 | Kobayashi ............. | H04N 23/54 250/208.1 |
| 2014/0008753 A1 * | 1/2014 | Tsuduki ................. | H10F 71/00 257/433 |
| 2020/0051887 A1 * | 2/2020 | Aoki ..................... | H10F 39/804 |
| 2020/0351422 A1 * | 11/2020 | Kusuda ................. | H10F 39/804 |
| 2020/0358973 A1 * | 11/2020 | Mayumi ................ | H01L 23/08 |
| 2021/0233949 A1 * | 7/2021 | Chino ................... | H10F 39/803 |
| 2021/0258455 A1 * | 8/2021 | Urakami ................ | H04N 23/54 |
| 2022/0085087 A1 * | 3/2022 | Mayumi ............... | H04N 25/00 |

FOREIGN PATENT DOCUMENTS

| | | | |
|---|---|---|---|
| JP | H0758909 A | 3/1995 | |
| JP | 3173927 B2 | 6/2001 | |

* cited by examiner

*Primary Examiner* — Pritham D Prabhakher
(74) *Attorney, Agent, or Firm* — Canon U.S.A., Inc. IP Division (57) ABSTRACT

An imaging apparatus includes an imaging element, a circuit board, a holding metal plate having an opening for holding the circuit board, wherein a linear expansion coefficient of the circuit board is smaller than a linear expansion coefficient of the holding metal plate, wherein one end surface of the imaging element parallel to a longer-side direction of a connector is directly fixed with a first adhesive to one end surface of the opposing holding metal plate parallel to the longer-side direction of the connector in the opening, and wherein another end surface of the imaging element parallel to the longer-side direction of the connector is directly fixed with a second adhesive to another end surface of the opposing holding metal plate parallel to the longer-side direction of the connector in the opening.

11 Claims, 6 Drawing Sheets

IMAGING APPARATUS

BACKGROUND

Field of the Disclosure

The present disclosure relates to an imaging apparatus that acquires an image of a subject using an imaging element, and particularly relates to the reliability in holding an imaging element unit.

Description of the Related Art

There has been conventionally a concern about deterioration of arrangement accuracy of an imaging element unit due to the temperature environment in which an electronic device using an imaging element is used or the heat generated by the electronic device during use.

For example, Japanese Patent No. 3173927 discusses an imaging apparatus in which a substrate on which an imaging element is mounted in the center is made by bonding a high thermal linear expansion member and a low thermal linear expansion member.

In the imaging apparatus, the central part of the substrate becomes deformed (curved) so as to protrude toward the lens side due to the difference in linear expansion amount between the high thermal linear expansion member and the low thermal linear expansion member with a temperature rise in the imaging apparatus, thereby suppressing a change in the distance between the final lens surface and the imaging element.

In the conventional technique discussed in Japanese Patent No. 3173927, there is a concern about an increase in the cost of the substrate on which the imaging element is mounted.

In order to enhance the effect of suppressing a change in the distance without increasing the size of the substrate on which the imaging element is mounted, the amount of deformation (curvature) of the substrate may be increased, which may cause damage to the substrate and the imaging element.

SUMMARY

The present disclosure describes embodiments of an imaging apparatus that suppress a change in the distance between the final lens surface and the imaging element due to a temperature change without increasing the cost and the size of the member holding the imaging element.

According to an aspect of the present disclosure, an imaging apparatus includes an imaging element, a circuit board on which the imaging element is mounted, a holding metal plate having an opening for holding the circuit board, a arithmetic circuit configured to process a signal acquired by the imaging element, and a connector mounted on the circuit board and configured to transmit the signal acquired by the imaging element to the arithmetic circuit, wherein the circuit board is in contact with and fixed to the holding metal plate on a mounting surface of the circuit board on which the imaging element is mounted, wherein a linear expansion coefficient of the circuit board is smaller than a linear expansion coefficient of the holding metal plate, wherein one end surface of the imaging element parallel to a longer-side direction of the connector is directly fixed with a first adhesive to one end surface of the opposing holding metal plate parallel to the longer-side direction of the connector in the opening, and wherein another end surface of the imaging element parallel to the longer-side direction of the connector is directly fixed with a second adhesive to another end surface of the opposing holding metal plate parallel to the longer-side direction of the connector in the opening.

Further features of various embodiments will become apparent from the following description of exemplary embodiments with reference to the attached drawings.

DESCRIPTION OF THE EXEMPLARY EMBODIMENTS

A lens-interchangeable digital camera will be described as an imaging apparatus according to a first exemplary embodiment with reference to FIGS. 1 and 2.

Figure 1A:
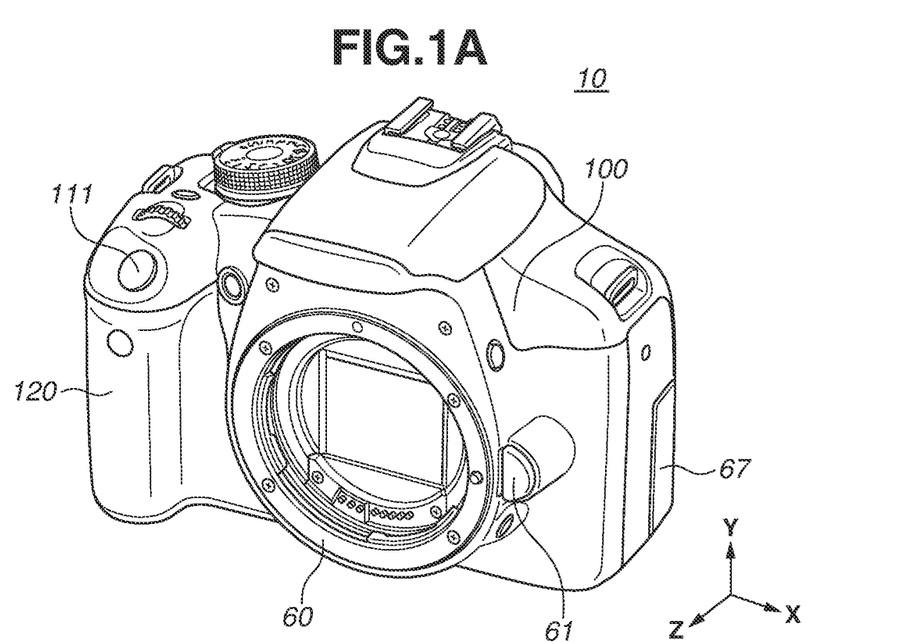
FIGS. 1A and 1B are diagrams illustrating the external appearance of an imaging apparatus according to a first exemplary embodiment of the present disclosure.
Figure 1B:
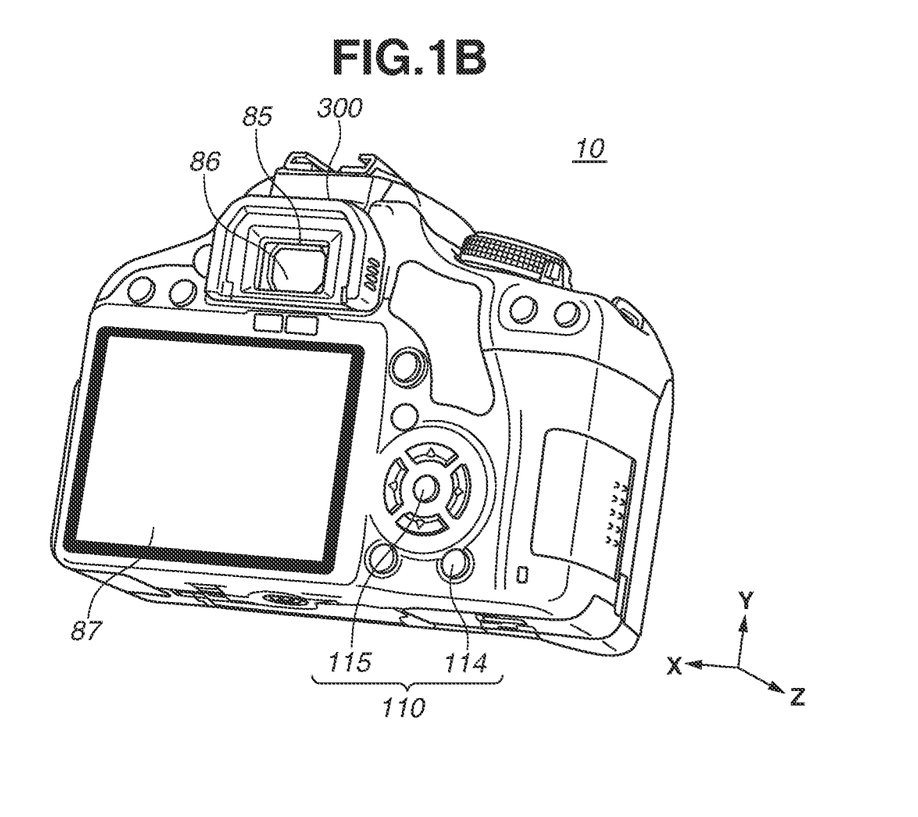
Figure 2:
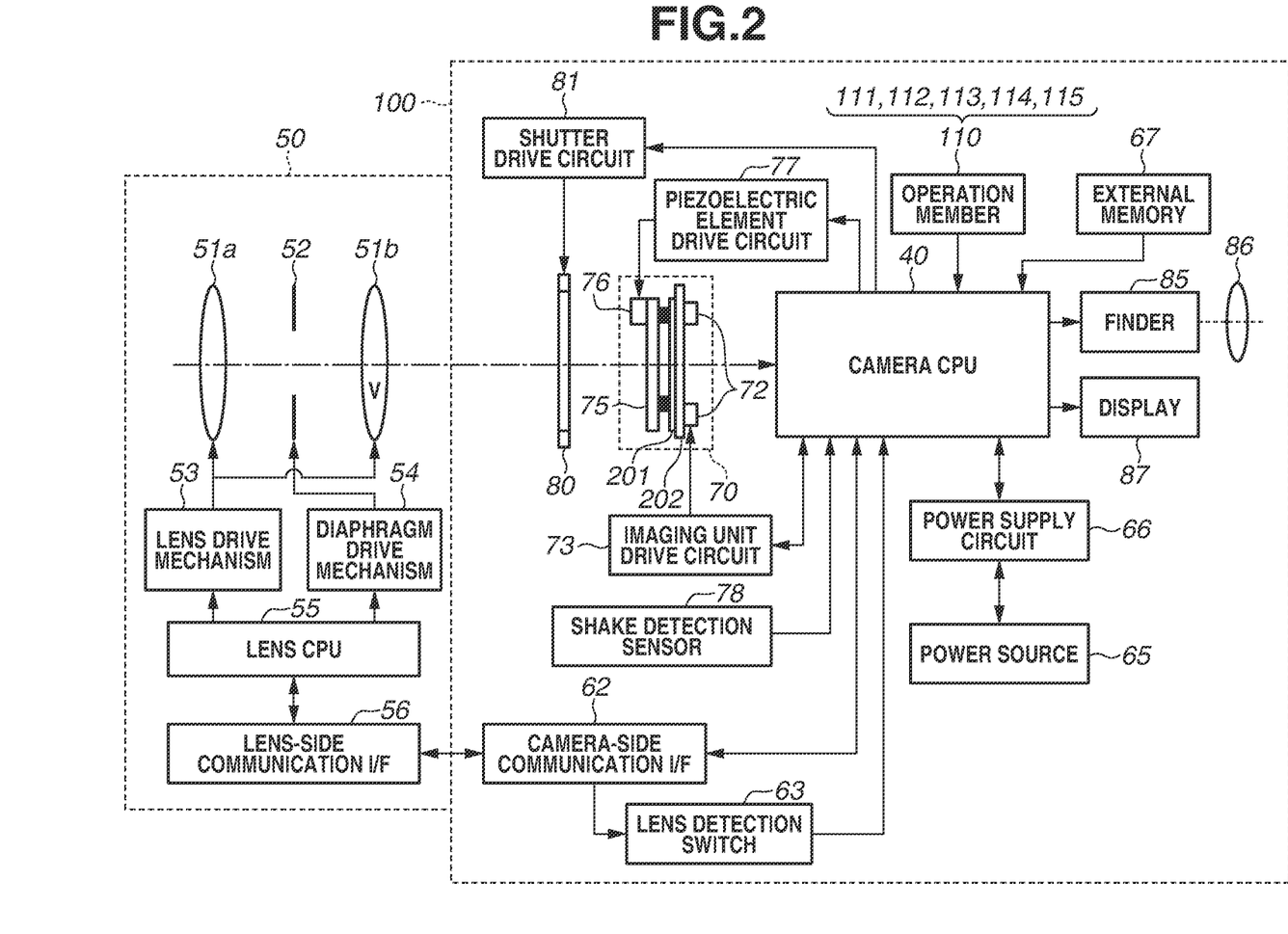
FIG. 2 is a block diagram illustrating a configuration of the imaging apparatus according to the first exemplary embodiment of the present disclosure.

A camera 10 illustrated in FIGS. 1A, 1B, and 2 is a lens-interchangeable digital camera.

FIGS. 1A and 1B illustrate a main body part 100 to which no lens unit is attached.

FIG. 1A is a perspective external view of the camera 10 as seen from the front side, and FIG. 1B is a perspective view of the camera 10 as seen from the rear side.

The direction of an optical axis of the camera 10 will be defined as Z-axis direction, the horizontal direction orthogonal to the Z-axis direction will be defined as X direction, and the vertical direction orthogonal to the Z-axis direction will be defined as Y direction.

FIG. 2 is a block diagram of a functional configuration of the camera 10.

Perspective View of Imaging Apparatus

The camera 10 includes a grip part 120 in the main body part 100 that constitutes the housing.

FIG. 1A illustrates the main body part 100 to which no lens unit is attached. The grip part 120 is a part where the user grips to hold the camera 10.

The grip part 120 is provided at least at one end of the main body part 100, and the user grips the grip part 120 with one hand such that the palm covers the grip part 120. The grip part 120 is formed in a curved shape so that the user can grip the grip part 120 with the fingers.

Forming the surface of the grip part 120 by an elastic member, such as a synthetic resin, makes it possible to obtain favorable grip performance.

Block Diagram of Imaging Apparatus

A lens unit 50 (FIG. 2) constitutes an imaging optical system and includes a focus lens 51a and a zoom lens 51b that are formed of a plurality of lenses.

The lens unit 50 can be attached to and detached from a mount opening 60 on the front surface of the camera 10, and the lens unit 50 is detached from the mount opening 60 by pressing a lens attach/detach button 61.

The lens unit 50 includes a diaphragm 52 that adjusts the aperture.

A lens drive mechanism 53 drives the focus lens 51a and the zoom lens 51b to perform focusing and zooming operations. A diaphragm drive mechanism 54 drives the diaphragm 52 to control the aperture value.

A lens central processing unit (CPU) 55 performs various types of signal processing to control the individual parts of the lens unit 50.

The main body part 100 and the lens unit 50 of the camera 10 can be electrically connected to each other via a camera-side communication interface (I/F) unit 62 and a lens-side communication I/F unit 56 to communicate with each other.

Power is supplied from the main body part 100 to the lens unit 50.

A lens detection switch 63 included in the main body part 100 determines whether the main body part 100 and the lens unit 50 of the camera 10 can communicate with each other via the camera-side communication I/F unit 62 and the lens-side communication I/F unit 56.

The lens detection switch 63 can also identify the type of the lens unit 50 attached to the main body part 100 of the camera 10.

The camera CPU 40 controls the operations of the individual elements of the camera 10. Hereinafter, the camera CPU 40 will be simply referred to as CPU 40.

A power source 65 supplies power to the individual elements of the camera 10.

The power source 65 is a secondary battery formed of a battery pack that is attachable to and detachable from the camera 10.

A power supply circuit 66 converts the voltage of the power source 65 into a voltage necessary for operating each of the elements of the camera 10.

A shutter 80 is a focal plane shutter that controls the incidence of imaging light rays by exposing or shielding the imaging element 201.

A shutter drive circuit 81 opens and closes a shutter curtain (not illustrated) to bring the imaging element 201 into the exposed state (open state) or the shielded state (closed state) and keep the imaging element 201 in the state.

The imaging element 201 receives the imaging light rays from the lens unit 50 and performs photoelectric conversion of the imaging light rays. For the imaging element 201, a complementary metal-oxide semiconductor (CMOS) image sensor or a charged coupled device (CCD) image sensor is used, and the imaging element 201 has an electronic shutter function.

A rectangular optical low-pass filter 75 made of a material such as liquid crystal is arranged on the front surface of the imaging element 201. A piezoelectric element 76 is adhered to and held on the surface of the optical low-pass filter 75. With application of a voltage, the piezoelectric element 76 vibrates the optical low-pass filter 75 in a wave form in the Z-axis direction.

A piezoelectric element drive circuit 77 controls the power distribution to the piezoelectric element 76 and is electrically connected to the piezoelectric element 76 via a piezoelectric element flexible substrate (not illustrated).

Controlling the power distribution to the piezoelectric element 76 allows the optical low-pass filter 75 to vibrate in different vibration modes of a plurality of orders.

This makes it possible to remove dust from the surface of the optical low-pass filter 75.

A shake detection sensor 78 is an angular speed sensor, for example, and periodically detects the angular speed of the camera 10 and converts the angular speed into an electric signal.

The output of the shake detection sensor 78 is acquired by the CPU 40 as a detection signal indicating the amount of shake of the camera 10.

An imaging unit drive mechanism 72 drives the imaging element 201.

An imaging unit 200 includes the imaging element 201, an imaging signal processing circuit board 202, the optical low-pass filter 75, the piezoelectric element 76, and the imaging unit drive mechanism 72.

The imaging unit 200 is provided with a drive coil (not illustrated), a permanent magnet (not illustrated), and a position detection sensor (not illustrated) in order to drive the imaging element 201 on a plane (X-Y plane) orthogonal to the optical axis of the camera 10.

An imaging unit drive circuit 73 is electrically connected to the imaging unit drive mechanism 72 via an imaging unit drive mechanism flexible substrate (not illustrated) to control the power distribution to the imaging unit drive mechanism 72.

The CPU 40 drives the imaging unit 200 in the direction in which the shake of the camera 10 is cancelled in accordance with the result of detection by the shake detection sensor 78, thereby correcting an image blur.

An external memory 67 is, for example, a semiconductor memory card attachable to and detachable from the main body part 100 and records data of captured images.

As illustrated in FIG. 1B, a display 87, such as a liquid crystal display (LCD), is provided on the rear surface of the camera 10, and a finder 85 for observing a subject light flux guided by the imaging element 201 is provided above the display 87.

The finder 85 is an electronic viewfinder including an eyepiece optical system 86 provided on the upper left of the rear surface of the camera 10. Through the finder 85, the user can check a live view image projected by the imaging element 201 and the settings of the camera 10.

The finder 85 protrudes from the main body part 100 of the camera 10 in a —Z direction.

In a state where the photographer views the camera 10 from the rear side, when the photographer holds the camera 10 by gripping the grip part 120 with the right hand, the finder 85 is positioned above the display 87.

Configuration for Securing Flange Focal Length of Camera 10

Next, a configuration for securing the flange focal length of the camera 10 will be described with reference to FIG. 3.

Figure 3A:
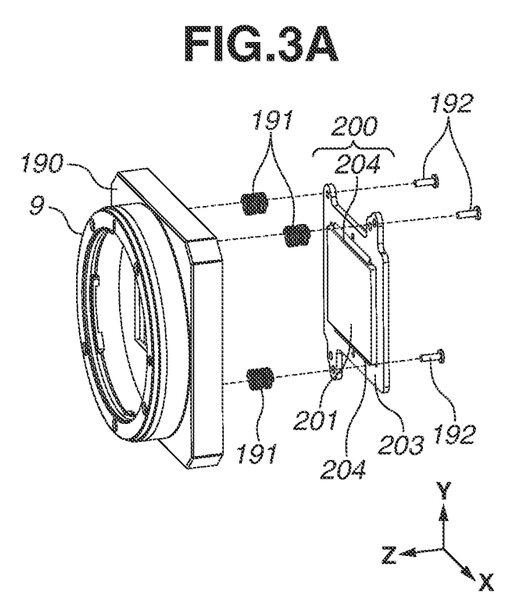
FIG. 3A is an exploded perspective view of an imaging element holding configuration concept in the imaging apparatus in the first exemplary embodiment.

FIG. 3A is an exploded view of an image element holding structure in the camera 10.

Figure 3B:
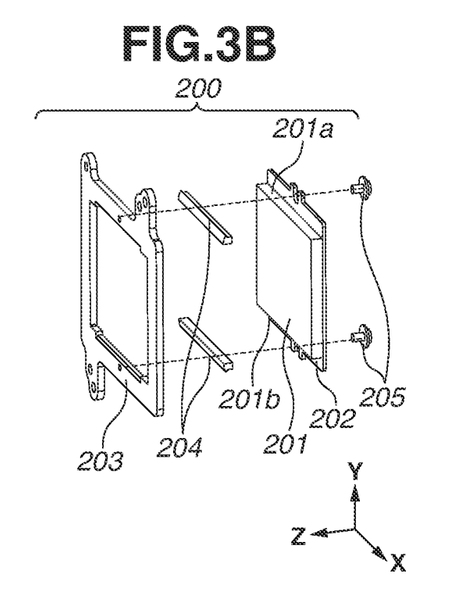
FIG. 3B is an exploded perspective view of an imaging unit in the first exemplary embodiment.

FIG. 3B is an exploded view of an imaging element holding configuration of the imaging unit 200.

Figure 3C:
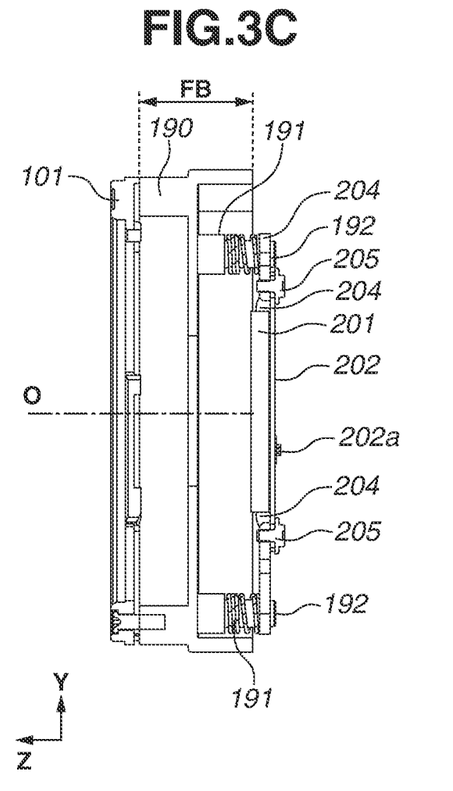
FIG. 3C is a cross-sectional view of the imaging unit in the first exemplary embodiment.

FIG. 3C is a cross-sectional view of the imaging element holding structure in the camera 10.

A mount 101 is fixed to the front end (the left end in the drawing) of a chassis member 190 serving as a structural member. The chassis member 190 is formed of a resin material or a metallic material.

The mount 101 is fixed to the chassis member 190. The imaging element 201 is arranged in an imaging element holding member 203 in the imaging unit 200. Adjustment springs 191 that are compression coil springs are arranged between the imaging element holding member 203 and the chassis member 190.

One end of each adjustment spring 191 is in contact with the chassis member 190, and the other end of each adjustment spring 191 is in contact with the imaging element holding member 203. The adjustment springs 191 are mounted in a state of being contracted from its natural state by a predetermined amount to bias the imaging element holding member 203 in a direction opposite to the mount 101 (minus Z-axis direction).

The distance from the mount 101 to the imaging element 201 illustrated with symbol "FB" in FIG. 3C is the flange focal length of the camera 10.

The flange focal length needs to be accurately adjusted in accordance with the focal distance of the lens. If the flange focal length changes, the subject will be out of focus and the quality of the captured image will become deteriorated.

The flange focal length of the camera 10 can be adjusted by the tightening amount of screws 192.

The imaging element holding member 203 is attached (fixed) by screws 205 to the rear end of a support shaft portion (not illustrated) that is a portion of the chassis member 190 on the side opposite to the mount 101.

The imaging signal processing circuit board 202 of the imaging element 201, such as a CMOS sensor or a CCD sensor, is in contact with the rear surface of the imaging element holding member 203.

As illustrated in FIGS. 3A and 3B, the imaging element 201 and the imaging signal processing circuit board 202 are fixed to the imaging element holding member 203 with adhesives 204 at two opposing side surfaces (201a and 201b) of the imaging element 201.

The imaging signal processing circuit board 202 is further fastened to the imaging element holding member 203 by the screws 205 at a plurality of places outside the imaging element 201 (outside the regions fixed with the adhesives 204).

When the camera 10 performs image capturing, the imaging element 201 and a signal processing chip generate heat.

As a result, the temperature of the chassis member 190 thermally connected to the imaging element 201 and the signal processing chip increases and the chassis member 190 expands linearly, so that the position of the imaging element 201 is shifted backward in the optical-axis direction.

That is, the flange focal length increases as compared to that before the image capturing.

The increase in the flange focal length shifts the in-focus position of the imaging lens unit from the imaging surface of the imaging element 201 so that the image of the subject becomes blurred.

In general, a resin material has a larger linear expansion coefficient than that of a metallic material. Thus, if the chassis member 190 is formed of a resin material, the flange focal length increases significantly.

The imaging element holding member 203 to which the imaging element 201 is fixed also linearly expands due to a temperature rise caused by the heat generated by the imaging element 201.

Figure 3D:
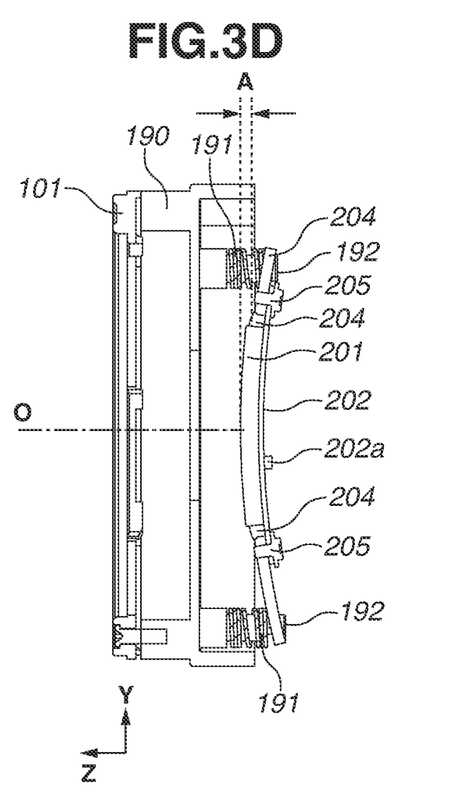
FIG. 3D is a cross-sectional view of the deformed imaging element in the first exemplary embodiment.

FIG. 3D illustrates a change in the position of the imaging element 201 in the optical-axis direction due to the linear expansion of the imaging element holding member 203 and imaging signal processing circuit board 202.

FIG. 3D illustrates a change in the position of the imaging element 201 in the optical-axis direction due to the deformation of the imaging signal processing circuit board 202 and imaging element holding member 203 toward the mount 101 caused by the linear expansion in a direction orthogonal to the optical axis O.

Along with a temperature rise, the imaging element holding member 203 and the imaging signal processing circuit board 202 each linearly expand in the direction orthogonal to the optical axis O.

Thus, if the linear expansion coefficient of the imaging signal processing circuit board 202 is smaller than the linear expansion coefficient of the imaging element holding member 203, the amount of linear expansion of the imaging signal processing circuit board 202 is smaller than the amount of linear expansion of the imaging element holding member 203.

The imaging signal processing circuit board 202 and the imaging element holding member 203 are fixed together with the adhesives 204 and the screws 205 in the Y direction.

Thus, the imaging signal processing circuit board 202 becomes deformed (curved) by the difference in the amount of linear expansion between the imaging signal processing circuit board 202 and the imaging element holding member 203, such that the central part of the imaging signal processing circuit board 202 is convex toward the mount 101.

The maximum value of the amount of convexity that is the amount of deformation of the imaging signal processing circuit board 202 toward the mount 101 is designated as A.

At this time, if there is no change in the position of the imaging element 201 to the rear side described above, the imaging element 201 mounted on (fixed to) the imaging signal processing circuit board 202 comes closer to the mount 101 by the maximum value of the amount of convexity A.

Thus, even if the chassis member 190 linearly expands in the direction in which the imaging element 201 is caused to move to the rear side, it is possible to reduce the amount of increase in the flange focal length by the maximum value of the amount of convexity A by taking advantage of the curvature of the imaging signal processing circuit board 202 toward the mount 101 due to the linear expansion in the Y direction.

The maximum amount of convexity A is larger as the linear expansion coefficient of the imaging signal processing circuit board 202 is larger than the linear expansion coefficient of the imaging element holding member 203 and the difference therebetween is larger.

The maximum amount of convexity A is also larger as the distance between the screws 205 fixing the imaging element holding member 203 and the imaging signal processing circuit board 202 is larger.

In this manner, in the present exemplary embodiment, the imaging signal processing circuit board 202 is fixed to the imaging element holding member 203 such that the linear expansion of the imaging signal processing circuit board 202 toward the mount 101 (lens side) is allowed and the deformation of the imaging signal processing circuit board 202 toward the mount 101 due to the linear expansion in the Y direction is allowed.

Accordingly, it is possible to suppress the increase in the flange focal length by the amount of deformation (the maximum amount of convexity A) of the imaging element holding member 203 toward the mount 101 in the direction orthogonal to the optical axis O.

At this time, the amount of deformation (the maximum amount of convexity A) can be adjusted by selecting the materials for the imaging element holding member 203 and the imaging signal processing circuit board 202 in consideration of their linear expansion coefficients.

Cross-Sectional View of Imaging Unit 200 Near Adhesive 204

Figure 4:
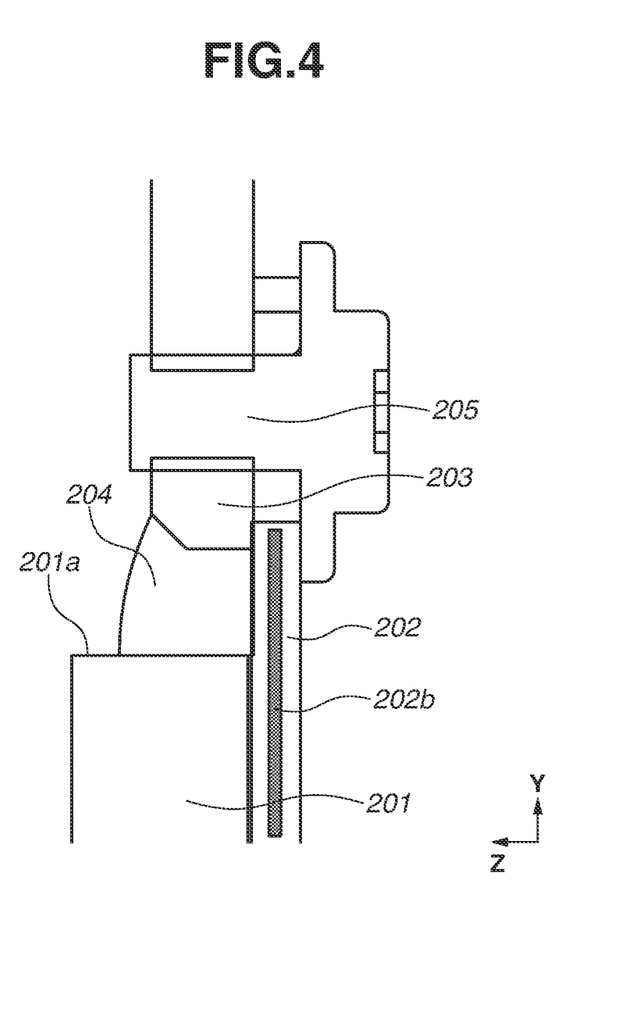
FIG. 4 is an enlarged cross-sectional view of the imaging unit in the first exemplary embodiment.

FIG. 4 is an enlarged cross-sectional view of the imaging unit 200 near the adhesive 204.

The flat-plate imaging element 201 mounted on the imaging signal processing circuit board 202 is arranged in the opening of the imaging element holding member 203.

As illustrated in FIG. 4, the adhesive 204 is applied onto the side surface 201a of the imaging element 201, the imaging signal processing circuit board 202, and the imaging element holding member 203 in a continuous manner.

Each of the screws 205 fastens the imaging element holding member 203 and the imaging signal processing circuit board 202 at a position farther away from the optical axis than the region to which the adhesive 204 is applied.

As described above, the maximum amount of convexity A can be made larger as the distance between the screws 205 fixing the imaging element holding member 203 and the imaging signal processing circuit board 202 is larger.

The side surface 201a of the imaging element 201 and the imaging signal processing circuit board 202 are connected by the adhesive 204.

Thus, it is possible to suppress a change in the flange focal length due to a temperature change, while securing a reliable bond between the imaging element 201 and the imaging signal processing circuit board 202, at the time of deformation.

The imaging signal processing circuit board 202 includes a heat radiation layer 202b higher in thermal conductivity than the other regions, and the heat radiation layer 202b partially overlaps the imaging element 201, the imaging element holding member 203, and the screws 205 in a plane perpendicular to the optical axis O (XY plane).

The two screws 205 are fastened to the rear surface of the imaging element holding member 203 symmetrically with respect to the optical axis O in the plane perpendicular to the optical axis O (XY plane) of the imaging element holding member 203, which has an opening.

Accordingly, it is possible to increase the amount of rise in temperature of the imaging element holding member 203 during image capturing, thereby further increasing the maximum amount of convexity A.

Imaging Element Holding Configuration at High Temperature

Figure 5A:
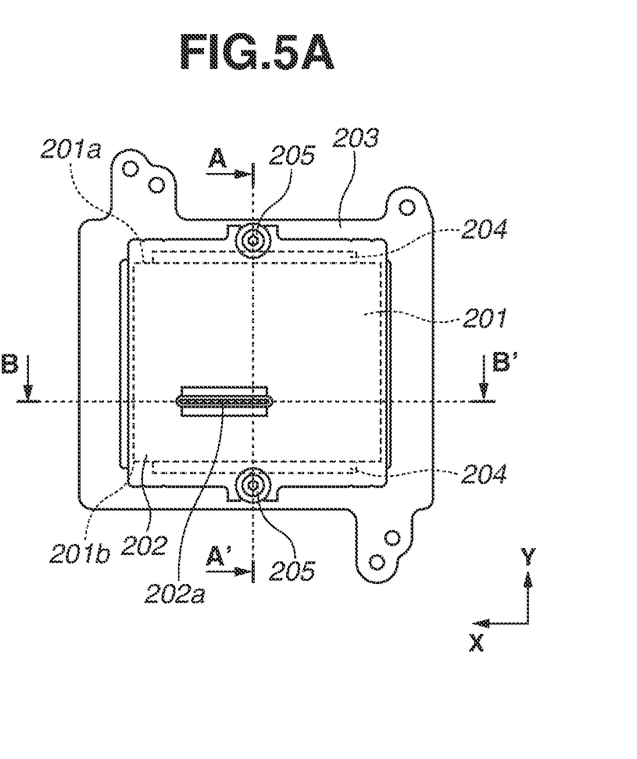
FIG. 5A is a rear view of the imaging unit in the first exemplary embodiment.

FIG. 5A is a rear view of the imaging element holding configuration according to the present exemplary embodiment at a high temperature.

Figure 5B:
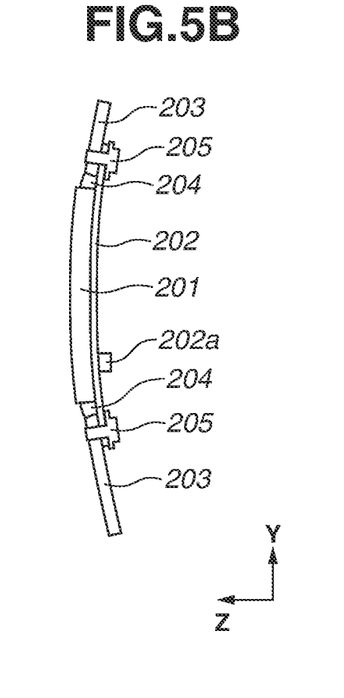
FIGS. 5B and 5C are cross-sectional views of the imaging unit in the first exemplary embodiment.
Figure 5C:
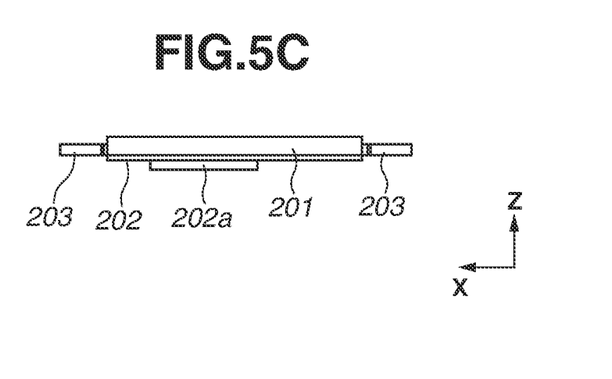

FIG. 5B is a cross-sectional view of the imaging element holding configuration illustrated in FIG. 5A taken along line A-A'. FIG. 5C is a cross-sectional view of the imaging element holding configuration illustrated in FIG. 5A taken along line B-B'.

An imaging element connector 202a is a connector for a flexible circuit board that electrically connects the CPU 40 and the imaging signal processing circuit board 202.

As illustrated in FIG. 5A, the imaging element connector 202a is mounted on the imaging signal processing circuit board 202 such that the pitch direction (longer-side direction) of the imaging element connector 202a is substantially parallel to the side surface 201a and the side surface 201b of the imaging element 201 where the adhesives 204 are applied. The longer-side direction is the X direction, and the shorter-side direction is the Y direction.

As illustrated in FIG. 5C, in the present exemplary embodiment, the imaging signal processing circuit board 202 and the imaging element holding member 203 are not fixed together in the X direction.

Thus, the amount of deformation of the imaging element 201 and the imaging signal processing circuit board 202 in the X direction (the cross section in FIG. 5C) is less than the deformation of the imaging element 201 and the imaging signal processing circuit board 202 in the Y direction (the cross section in FIG. 5B).

Accordingly, it is possible to ensure the mounting reliability of the imaging element connector 202a without causing the imaging element connector 202a to interfere with the deformation of the imaging element 201 and imaging signal processing circuit board 202.

It is possible to suppress a change in the flange focal length due to a temperature change while securing a reliable bond between the imaging element 201 and the imaging signal processing circuit board 202.

Hereinafter, features of the present exemplary embodiment will be summarized.

The imaging apparatus (FIGS. 3A to 3D) includes the circuit board (imaging signal processing circuit board) 202 on which the imaging element 201 is mounted and includes the holding metal plate (imaging element holding member) 203 having the opening for holding the circuit board 202.

The imaging apparatus (FIGS. 3A to 3D) includes the arithmetic circuit (camera CPU) 40 that processes signals acquired by the imaging element 201 and the connector (imaging element connector) 202a that is mounted on the circuit board 202 to transmit the signals acquired by the imaging element 201 to the arithmetic circuit 40.

The circuit board 202 is in contact with and fixed to the holding metal plate 203 on the mounting surface on which the imaging element 201 is mounted.

The linear expansion coefficient of the circuit board 202 is smaller than the linear expansion coefficient of the holding metal plate 203.

One end surface (side surface) 201a of the imaging element 201 parallel to the longer-side direction of the connector 202a is directly fixed with a first adhesive 204 to one end surface of the opposing holding metal plate 203 parallel to the longer-side direction of the connector 202a in the opening.

The other end surface (side surface) 201b of the imaging element 201 parallel to the longer-side direction of the connector 202a is directly fixed with a second adhesive 204 to the other end surface of the opposing holding metal plate 203 parallel to the longer-side direction of the connector 202a in the opening.

The circuit board 202 is fixed to the holding metal plate 203 with a first screw 205 at a position farther away from the optical axis than the first adhesive 204.

The circuit board 202 is fixed to the holding metal plate 203 with a second screw 205 at a position farther away from the optical axis than the second adhesive 204 (FIGS. 3A to 3D and 4).

The circuit board 202 includes the heat radiation layer 202b higher in thermal conductivity than the surface layer of the mounting surface. When being viewed from the direction of the optical axis, the heat radiation layer 202b overlaps the holding metal plate 203 provided at the outer edge of the imaging element 201 (FIG. 4).

The circuit board 202 has the heat radiation layer 202b higher in thermal conductivity than the surface layer of the mounting surface. When being viewed from the direction of the optical axis, the heat radiation layer 202b overlaps the holding metal plate 203 provided at the outer edge of the imaging element 201, the first screw 205, and the second screw 205 (FIG. 4).

The one end surface 201a of the imaging element 201 parallel to the longer-side direction of the connector 202a and the mounting surface of the circuit board 202 are directly fixed with the first adhesive 204 to the one end surface of the opposing holding metal plate 203 parallel to the longer-side direction of the connector 202a in the opening.

The other end surface 201b of the imaging element 201 parallel to the longer-side direction of the connector 202a and the mounting surface of the circuit board 202 are directly fixed with the second adhesive 204 to the other end surface of the opposing holding metal plate 203 parallel to the longer-side direction of the connector 202a in the opening (FIG. 4).

Figure 6:
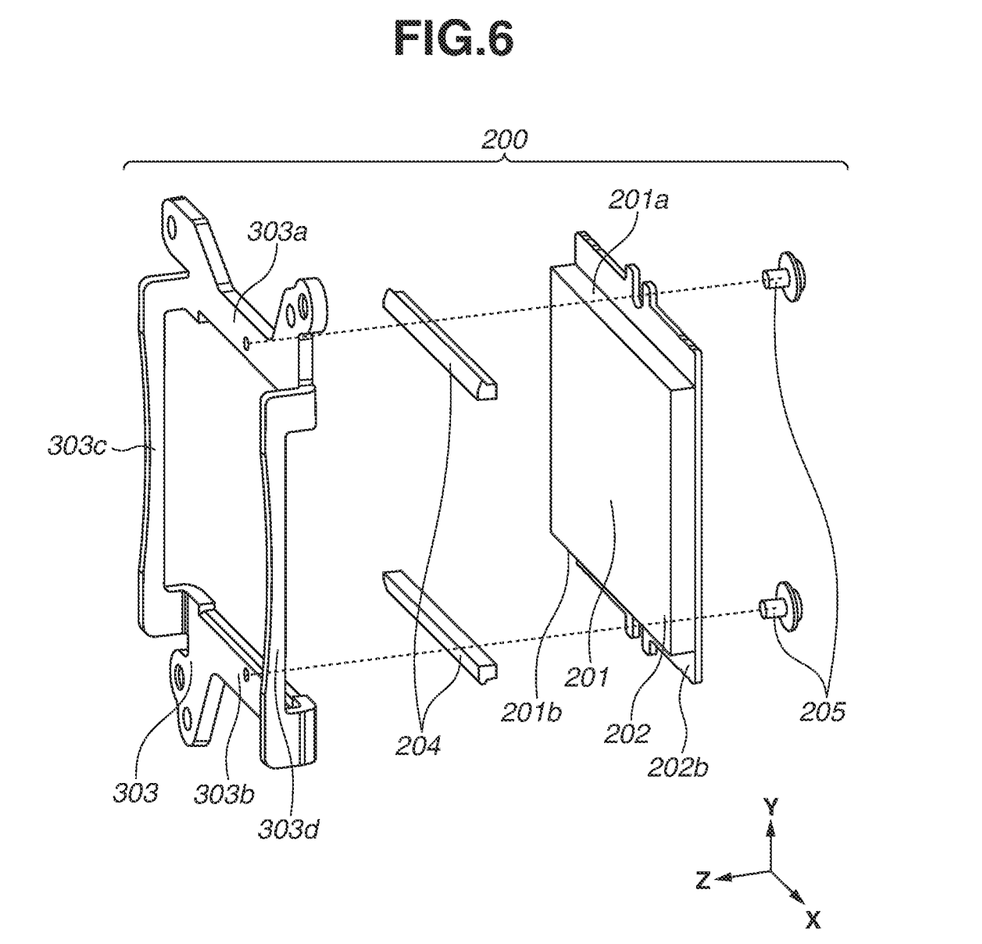
FIG. 6 is an exploded perspective view of an imaging unit according to a second exemplary embodiment.

FIG. 6 is an exploded view of a holding configuration of an imaging element 201 of an imaging unit 200 according to a second exemplary embodiment.

In FIG. 6, the same components as those in the first exemplary embodiment are denoted with the same reference numerals as those in the first exemplary embodiment.

In the present exemplary embodiment, the imaging element 201 and an imaging signal processing circuit board 202 are fixed to an imaging element holding member 303 with adhesives 204 on two opposing side surfaces (201a and 201b) of the imaging element 201.

The imaging signal processing circuit board 202 of the imaging element 201 is positioned on the rear side of the imaging element holding member 303.

In regions parallel to the side surface 201a and the side surface 201b of the imaging element 201, the imaging element holding member 303 (which includes sides 303a and 303b) and the imaging signal processing circuit board 202 (which includes the imaging element connector 202a (not visible in FIG. 6) and the heat radiation layer 202b) are in contact with each other.

The imaging element holding member 303 is a plate member formed of a metal plate or the like. The imaging element holding member 303 includes raised and bent parts in a direction substantially perpendicular to the direction of the optical axis at sides 303c and 303d perpendicular to the side surfaces 201a and 201b of the imaging element 201.

Two vertical sides connecting the side surfaces 201a and 201b of the imaging element 201 having the shape of a horizontally long rectangular solid are not adhered or fixed to the imaging signal processing circuit board 202 with an adhesive.

In the YZ plane, the raised and bent parts 303c and 303d of the imaging element holding member 303 that are in the direction substantially perpendicular to the direction of the optical axis form a U shape, and the raised and bent parts 303c and 303d are each formed of two arm portions at the lateral ends and a curved portion that is curved toward the image surface (FIG. 6).

Each of the curved portions of the raised and bent parts 303c and 303d has a narrower width in the center in the Z direction in the YZ plane than those of the surrounding portions.

In each of the raised and bent parts 303c and 303d positioned outside of the imaging element 201, the two arm portions at the lateral ends each have a wider width in the Z direction in the YZ plane than that of the curved portion.

As described above with reference to FIGS. 3A to 3D, 5A, and 5B, the raised and bent parts 303c and 303d are shaped so as to suppress the deformation in the X direction (the cross sections in FIGS. 3D and 5B).

At the sides (303c and 303d) perpendicular to the side surface 201a and the side surface 201b of the imaging element 201, the imaging element holding member 303 and the imaging signal processing circuit board 202 are not in contact with each other.

In the present exemplary embodiment, the imaging signal processing circuit board 202 is also fastened to the imaging element holding member 303 with screws 205 or the like at a plurality of places outside of the imaging element 201 (outside the regions fixed with the adhesives 204).

In the present exemplary embodiment, it is possible to suppress a change in the flange focal length due to a temperature change without increasing the size of the imaging unit 200.

The features of the present exemplary embodiment will be summarized below.

One end surface of the circuit board 202 perpendicular to the longer-side direction of the connector 202a is not bonded or fixed to one end surface of the opposing holding metal plate (imaging element holding member) 303 perpendicular to the longer-side direction of the connector 202a in the opening.

The other end surface of the circuit board 202 perpendicular to the longer-side direction of the connector 202a is not bonded or fixed to the other end surface of the opposing holding metal plate 303 perpendicular to the longer-side direction of the connector 202a in the opening (FIG. 6).

When being viewed from the direction perpendicular to the optical axis, the end surfaces of the holding metal plate 303 overlap the imaging element 201 in the opening (FIG. 6). This has an advantageous effect of equalization of the curvature (suppression of one-sided blurring) and downsizing.

One end surface 201a of the imaging element 201 parallel to the longer-side direction of the connector 202a is directly fixed with the first adhesive 204 to one end surface of the opposing holding metal plate 303 parallel to the longer-side direction of the connector 202a in the opening. The other end surface 201b of the imaging element 201 parallel to the longer-side direction of the connector 202a is directly fixed with the second adhesive 204 to the other end surface of the opposing holding metal plate 303 parallel to the longer-side direction of the connector 202a in the opening.

Some exemplary embodiments have been described above. However, some embodiments are not limited to the exemplary embodiments, and embodiments can be modified and changed in various manners within the gist of the present disclosure.

According to the present disclosure, embodiments of an imaging apparatus suppress a change in the distance between the final lens surface and the imaging element due to a temperature change without increasing the cost or the size of the members holding the imaging element.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-101181, which was filed on Jun. 23, 2022 and which is hereby incorporated by reference herein in its entirety.

What is claimed is:

1. An imaging apparatus comprising:
   an imaging element;
   a circuit board on which the imaging element is mounted;
   a holding metal plate having an opening for holding the circuit board;

a arithmetic circuit configured to process a signal acquired by the imaging element; and a connector mounted on the circuit board and configured to transmit the signal acquired by the imaging element to the arithmetic circuit, wherein the circuit board is in contact with and fixed to the holding metal plate on a mounting surface of the circuit board on which the imaging element is mounted, wherein a linear expansion coefficient of the circuit board is smaller than a linear expansion coefficient of the holding metal plate, wherein one end surface of the imaging element parallel to a longer-side direction of the connector is directly fixed with a first adhesive to one end surface of the opposing holding metal plate parallel to the longer-side direction of the connector in the opening, and wherein another end surface of the imaging element parallel to the longer-side direction of the connector is directly fixed with a second adhesive to another end surface of the opposing holding metal plate parallel to the longer-side direction of the connector in the opening.

2. The imaging apparatus according to claim 1, wherein the circuit board is fixed to the holding metal plate with a first screw at a position farther away from an optical axis than the first adhesive, and wherein the circuit board is fixed to the holding metal plate with a second screw at a position farther away from an optical axis than the second adhesive.

3. The imaging apparatus according to claim 2, wherein the circuit board includes a heat radiation layer higher in thermal conductivity than a surface layer of the mounting surface, and wherein when being viewed from a direction of the optical axis, the heat radiation layer overlaps the holding metal plate provided at an outer edge of the imaging element.

4. The imaging apparatus according to claim 3, wherein when being viewed from the direction of the optical axis, the heat radiation layer overlaps the holding metal plate provided at the outer edge of the imaging element, the first screw, and the second screw.

5. The imaging apparatus according to claim 1, wherein one end surface of the circuit board perpendicular to the longer-side direction of the connector is not bonded or fixed to one end surface of the opposing holding metal plate perpendicular to the longer-side direction of the connector in the opening, and wherein another end surface of the circuit board perpendicular to the longer-side direction of the connector is not bonded or fixed to another end surface of the opposing holding metal plate perpendicular to the longer-side direction of the connector in the opening.

6. The imaging apparatus according to claim 5, wherein when being viewed from a direction perpendicular to the optical axis, an end surface of the opening of the holding metal plate overlaps the imaging element.

7. The imaging apparatus according to claim 1, wherein the one end surface of the imaging element parallel to the longer-side direction of the connector and the mounting surface of the circuit board are directly fixed to the one end surface of the opposing holding metal plate parallel to the longer-side direction of the connector in the opening, and wherein the other end surface of the imaging element parallel to the longer-side direction of the connector and the mounting surface of the circuit board are directly fixed to the other end surface of the opposing holding metal plate parallel to the longer-side direction of the connector in the opening.

8. An imaging apparatus comprising:

an imaging element;

a circuit board on which the imaging element is mounted, wherein the imaging element is mounted on a mounting surface of the circuit board;

a holding metal plate having an opening for holding the circuit board; and a connector mounted on the circuit board and configured to transmit the signal acquired by the imaging element to another circuit, wherein the circuit board is in contact with and fixed to the holding metal plate on the mounting surface of the circuit board, wherein a linear expansion coefficient of the circuit board is smaller than a linear expansion coefficient of the holding metal plate, wherein one end surface of the imaging element parallel to a longer-side direction of the imaging element is directly fixed with a first adhesive to a respective opposing end surface of the holding metal plate that is parallel to the longer-side direction of the imaging element in the opening, and wherein another end surface of the imaging element parallel to the longer-side direction of the imaging element is directly fixed with a second adhesive to a respective opposing end surface of the holding metal plate that is parallel to the longer-side direction of the imaging element in the opening.

9. The imaging apparatus according to claim 8, wherein the circuit board is fixed to the holding metal plate with a first screw at a position farther away from a center of the imaging element than the first adhesive, and wherein the circuit board is fixed to the holding metal plate with a second screw at a position farther away from a center of the imaging element than the second adhesive.

10. The imaging apparatus according to claim 9, wherein the circuit board includes a heat radiation layer higher in thermal conductivity than a surface layer of the mounting surface, and wherein when being viewed from a direction perpendicular to the mounting surface, the heat radiation layer overlaps the holding metal plate provided at an outer edge of the imaging element.

11. The imaging apparatus according to claim 8, wherein one end surface of the circuit board perpendicular to the longer-side direction of the imaging element is not bonded or fixed to a respective opposing end surface of the holding metal plate that is perpendicular to the longer-side direction of the connector in the opening, and wherein another end surface of the circuit board perpendicular to the longer-side direction of the imaging element is not bonded or fixed to a respective opposing end surface of the holding metal plate that is perpendicular to the longer-side direction of the connector in the opening.

* * * * *